US011895702B2

(12) United States Patent
Lunttila et al.

(10) Patent No.: US 11,895,702 B2
(45) Date of Patent: Feb. 6, 2024

(54) LISTEN BEFORE TALK (LBT) FAILURE TRIGGERED SCHEDULING REQUEST INDICATION

(71) Applicant: NOKIA TECHNOLOGIES OY, Espoo (FI)

(72) Inventors: Timo Erkki Lunttila, Espoo (FI); Kari Juhani Hooli, Oulu (FI); Arto Lehti, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 175 days.

(21) Appl. No.: 17/394,934

(22) Filed: Aug. 5, 2021

(65) Prior Publication Data

US 2023/0041667 A1 Feb. 9, 2023

(51) Int. Cl.
*H04W 74/08* (2009.01)
*H04W 72/23* (2023.01)

(52) U.S. Cl.
CPC ....... *H04W 74/0808* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0359411 A1* | 11/2020 | Li | H04W 16/14 |
| 2021/0007149 A1* | 1/2021 | Li | H04L 27/0006 |
| 2021/0051702 A1* | 2/2021 | Bhattad | H04W 76/27 |
| 2021/0100002 A1* | 4/2021 | Pan | H04W 72/23 |
| 2021/0235491 A1* | 7/2021 | Iyer | H04W 72/1268 |
| 2021/0250142 A1* | 8/2021 | Wang | H04L 5/0053 |
| 2021/0320760 A1* | 10/2021 | Rastegardoost | H04L 1/0061 |
| 2022/0174736 A1* | 6/2022 | Oviedo | H04L 5/0053 |
| 2022/0369357 A1* | 11/2022 | Luo | H04W 72/21 |

FOREIGN PATENT DOCUMENTS

EP 3826411 A1 5/2021

* cited by examiner

*Primary Examiner* — Clemence S Han
(74) *Attorney, Agent, or Firm* — SQUIRE PATTON BOGGS (US) LLP (57) ABSTRACT

Systems, methods, apparatuses, and computer program products for handling a listen before talk (LBT) failure are provided. One method may include performing, by a user equipment, listen before talk (LBT). When the listen before talk (LBT) is successful, the method may include transmitting an intended transmission subsequent to the listen before talk (LBT). When the listen before talk (LBT) is not successful, the method may include transmitting an indication of listen before talk (LBT) failure by transmitting a portion of the intended transmission subsequent to the listen before talk (LBT).

20 Claims, 3 Drawing Sheets

LISTEN BEFORE TALK (LBT) FAILURE TRIGGERED SCHEDULING REQUEST INDICATION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for handling a listen before talk (LBT) failure.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method that may include performing, by a user equipment, listen before talk (LBT). In response to the listen before talk (LBT) being successful, the method includes transmitting an intended transmission subsequent to the listen before talk (LBT). In response to the listen before talk (LBT) not being successful, the method includes transmitting an indication of listen before talk (LBT) failure by transmitting a portion of the intended transmission subsequent to the listen before talk (LBT).

In one embodiment, the method may include receiving configuration of physical uplink shared channel (PUSCH) resources from a network node. In case of dynamic scheduling, the configuration comprises an uplink grant. In case of configured grant transmission, the configuration comprises configured grant (CG) physical uplink shared channel (PUSCH) configuration or activation message.

In an embodiment, the performing comprises performing the listen before talk (LBT) prior to transmission on the physical uplink shared channel (PUSCH) resources. In response to the listen before talk (LBT) being successful, the transmitting comprises transmitting the intended transmission on the physical uplink shared channel (PUSCH) resources. In response to the listen before talk (LBT) not being successful, the transmitting comprises transmitting the portion of the intended transmission on the physical uplink shared channel (PUSCH) resources.

In one embodiment, the transmitting of the indication of the listen before talk (LBT) failure comprises transmitting the indication on a first symbol of the physical uplink shared channel (PUSCH) resources.

In an embodiment, the transmitting of the indication of the listen before talk (LBT) failure comprises transmitting a demodulation reference signal (DMRS) on the first symbol of the physical uplink shared channel (PUSCH) resources.

In one embodiment, the transmitting of the indication of the listen before talk (LBT) failure comprises transmitting a demodulation reference signal (DMRS) and uplink shared channel (UL-SCH) resource elements on the first symbol of the physical uplink shared channel (PUSCH) resources.

In an embodiment, the transmitting of the indication of the listen before talk (LBT) failure comprises transmitting the indication on a symbol after a first symbol of the physical uplink shared channel (PUSCH) resources.

In one embodiment, the method may include performing another listen before talk (LBT) prior to transmitting the indication on a symbol after a first symbol of the physical uplink shared channel (PUSCH) resources.

In an embodiment, the transmitting of the indication of the listen before talk (LBT) failure comprises transmitting a demodulation reference signal (DMRS) on a second or later symbol of the physical uplink shared channel (PUSCH) resources.

In one embodiment, the transmitting of the indication of the listen before talk (LBT) failure comprises: transmitting a demodulation reference signal (DMRS) on a second or later symbol of the physical uplink shared channel (PUSCH) resources, and transmitting control information in a same symbol as the demodulation reference signal or a next symbol after the demodulation reference signal. The control information may include information about an energy level detected when measurement was performed for the listen before talk (LBT). In an embodiment, the transmitting of the listen before talk (LBT) failure includes transmitting a demodulation reference signal (DMRS), where a symbol index for the demodulation reference signal (DMRS) indicates the detected energy level.

An embodiment is directed to an apparatus, which may include at least one processor and at least one memory comprising computer program code. The at least one memory and computer program code configured, with the at least one processor, to cause the apparatus at least to perform: performing listen before talk (LBT); in response to the listen before talk (LBT) being successful, transmitting an intended transmission subsequent to the listen before talk (LBT); and in response to the listen before talk (LBT) not being successful, transmitting an indication of listen before talk (LBT) failure by transmitting a portion of the intended transmission subsequent to the listen before talk (LBT).

In one embodiment, the at least one memory and computer program code are configured, with the at least one processor, to cause the apparatus at least to perform: receiving a configuration of physical uplink shared channel (PUSCH) resources from a network node; in case of dynamic scheduling, the configuration comprises an uplink grant; and in case of configured grant transmission, the configuration comprises configured grant (CG) physical uplink shared channel (PUSCH) configuration or activation message.

In an embodiment, the performing comprises the apparatus performing the listen before talk (LBT) prior to transmission on the physical uplink shared channel (PUSCH) resources. In response to the listen before talk (LBT) being successful, the transmitting comprises the apparatus transmitting the intended transmission on the physical uplink shared channel (PUSCH) resources. In response to the listen before talk (LBT) not being successful, the transmitting comprises the apparatus transmitting the portion of the intended transmission on the physical uplink shared channel (PUSCH) resources.

In one embodiment, the transmitting of the indication of the listen before talk (LBT) failure comprises the apparatus transmitting the indication on a first symbol of the physical uplink shared channel (PUSCH) resources.

In an embodiment, the transmitting of the indication of the listen before talk (LBT) failure comprises the apparatus transmitting a demodulation reference signal (DMRS) on the first symbol of the physical uplink shared channel (PUSCH) resources.

In one embodiment, the transmitting of the indication of the listen before talk (LBT) failure comprises the apparatus transmitting a demodulation reference signal (DMRS) and uplink shared channel (UL-SCH) resource elements on the first symbol of the physical uplink shared channel (PUSCH) resources.

In an embodiment, the transmitting of the indication of the listen before talk (LBT) failure comprises the apparatus transmitting the indication on symbol after a first symbol of the physical uplink shared channel (PUSCH) resources.

In one embodiment, the at least one memory and computer program code are configured, with the at least one processor, to cause the apparatus at least to perform another listen before talk (LBT) prior to transmitting the indication on a symbol after a first symbol of the physical uplink shared channel (PUSCH) resources.

In an embodiment, the transmitting of the indication of the listen before talk (LBT) failure comprises the apparatus transmitting a demodulation reference signal (DMRS) on a second or later symbol of the physical uplink shared channel (PUSCH) resources.

In one embodiment, the transmitting of the indication of the listen before talk (LBT) failure comprises: the apparatus transmitting a demodulation reference signal (DMRS) on a second or later symbol of the physical uplink shared channel (PUSCH) resources, and transmitting control information in a same symbol as the demodulation reference signal or a next symbol after the demodulation reference signal. The control information may include information about an energy level detected when measurement was performed for the listen before talk (LBT). In an embodiment, the transmitting of the listen before talk (LBT) failure includes transmitting a demodulation reference signal (DMRS), where a symbol index for the demodulation reference signal (DMRS) indicates the detected energy level.

An embodiment is directed to an apparatus that may include means for performing listen before talk (LBT). In response to the listen before talk (LBT) being successful, the apparatus includes means for transmitting an intended transmission subsequent to the listen before talk (LBT). In response to the listen before talk (LBT) not being successful, the apparatus includes means for transmitting an indication of listen before talk (LBT) failure by transmitting a portion of the intended transmission subsequent to the listen before talk (LBT).

In one embodiment, the apparatus may include means for receiving an indication or configuration of physical uplink shared channel (PUSCH) resources from a network node.

In an embodiment, in case of dynamic scheduling, the configuration comprises an uplink grant and, in case of configured grant transmission, the configuration comprises configured grant (CG) physical uplink shared channel (PUSCH) configuration or activation message.

In one embodiment, the means for performing comprises means for performing the listen before talk (LBT) prior to the physical uplink shared channel (PUSCH) resources.

In an embodiment, when the listen before talk (LBT) is successful, the means for transmitting comprises means for transmitting the intended transmission on the physical uplink shared channel (PUSCH) resources. When the listen before talk (LBT) is not successful, the means for transmitting comprises means for transmitting the portion of the intended transmission on the physical uplink shared channel (PUSCH) resources.

In one embodiment, the means for transmitting of the indication of the listen before talk (LBT) failure comprises means for transmitting the indication on a first symbol of the physical uplink shared channel (PUSCH) resources.

In an embodiment, the means for transmitting of the indication of the listen before talk (LBT) failure comprises means for transmitting a demodulation reference signal (DMRS) on the first symbol of the physical uplink shared channel (PUSCH) resources.

In one embodiment, the means for transmitting of the indication of the listen before talk (LBT) failure comprises means for transmitting a demodulation reference signal (DMRS) and uplink shared channel (UL-SCH) resource elements on the first symbol of the physical uplink shared channel (PUSCH) resources.

In an embodiment, the means for transmitting of the indication of the listen before talk (LBT) failure comprises means for transmitting the indication on symbol after a first symbol of the physical uplink shared channel (PUSCH) resources.

In one embodiment, the apparatus may include means for performing another listen before talk (LBT) prior to transmitting the indication on a symbol after a first symbol of the physical uplink shared channel (PUSCH) resources.

In an embodiment, the means for transmitting of the indication of the listen before talk (LBT) failure comprises means for transmitting a demodulation reference signal (DMRS) on a second or later symbol of the physical uplink shared channel (PUSCH) resources.

In one embodiment, the means for transmitting of the indication of the listen before talk (LBT) failure comprises means for transmitting a demodulation reference signal (DMRS) on a second or later symbol of the physical uplink shared channel (PUSCH) resources, and means for transmitting control information in a same symbol as the demodulation reference signal or a next symbol after the demodulation reference signal. The control information may include information about an energy level detected when measurement was performed for the listen before talk (LBT). In an embodiment, the means for transmitting of the listen before talk (LBT) failure includes means for transmitting a demodulation reference signal (DMRS), where a symbol index for the demodulation reference signal (DMRS) indicates the detected energy level.

An embodiment may be directed to a non-transitory computer readable medium comprising program instructions stored thereon for performing at least the following: performing listen before talk (LBT), when the listen before talk (LBT) is successful, transmitting an intended transmission subsequent to the listen before talk (LBT), and when the listen before talk (LBT) is not successful, transmitting an indication of listen before talk (LBT) failure by transmitting a portion of the intended transmission subsequent to the listen before talk (LBT).

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handling a listen before talk (LBT) failure, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments described herein may relate to 60 GHz unlicensed frequency bands and, more specifically, co-channel coexistence. For example, an embodiment may relate to 3GPP New Radio (NR) physical layer design, such as supporting NR from 52.6 GHz to 71 GHz. Some objectives of this NR physical layer design may include studying changes to NR using existing downlink (DL)/uplink (UL) NR waveform to support operation between 52.6 GHz and 71 GHz, studying applicable numerology including subcarrier spacing, channel bandwidth (including maximum BW), and their impact to frequency range 2 (FR2) physical layer design to support system functionality considering practical radio frequency (RF) impairments, and identifying potential problems to physical signal/channels. Further, channel access mechanisms are being studied, taking into account potential interference to/from other nodes, assuming beam-based operation, in order to comply with the regulatory requirements applicable to unlicensed spectrum for frequencies, e.g., between 52.6 GHz and 71 GHz. It is noted that potential interference impact, if identified, may require interference mitigation solutions as part of channel access mechanism.

Further objectives for channel access procedures relate to physical layer procedure(s) including channel access mechanism assuming beam based operation in order to comply with the regulatory requirements applicable to unlicensed spectrum for frequencies, e.g., between 52.6 GHz and 71 GHz. This may include specifying both LBT and No-LBT related procedures, and for the No-LBT case no additional sensing mechanism is specified. This may also include specifying, if needed, omni-directional LBT, directional LBT and receiver assistance in channel access, and energy detection threshold enhancement.

During a LBT procedure, a gNB/UE assesses the occupancy of a channel. During the channel assessment, the gNB/UE may measure energy on the channel and compare the result of the measurement against a threshold. If the measured energy is below the threshold, the channel is assessed to be vacant. In addition, a gNB/UE may perform a number of channel assessments during the LBT procedure. If the channel is assessed to be vacant on a determined number of channel assessments, including the latest channel assessment, the LBT procedures determine that a gNB/UE may occupy the channel with transmission. This determination that the channel may be occupied is referred to as LBT being successful. If the channel is not assessed to be vacant on a determined number of channel assessments, or during the latest channel assessment prior to starting time of an intended transmission, the LBT procedure determines that gNB/UE cannot occupy the channel with transmission. In this case, LBT is not successful. This may also be referred to as a LBT failure. The determined number of channel assessments may be predetermined or random or a combination of both and may depend, e.g., on the type or variant of the LBT procedure.

The regulations for operation on 60 GHz unlicensed spectrum require use of a spectrum sharing or co-channel coexistence mechanism, but do not require any specific type of a mechanism. In some regions, separate regulatory requirements are defined for different use cases or deployments, e.g., for fixed outdoor equipment or point-to-point communications or for indoor-only use. However, the ETSI harmonized standard (EN 302 567) that targets, e.g., indoor use and fulfils the corresponding European regulation for frequency band c2, mandates the use of LBT. Correspondingly, it has been agreed that NR will support channel access with LBT as well as without LBT on 60 GHz. In particular, it has been agreed that, for a gNB/UE to initiate a channel occupancy, both channel access with LBT mechanism(s) and a channel access mechanism without LBT are supported. It is left for further study whether LBT mechanisms, such as Omni-directional LBT, directional LBT and receiver assisted LBT type of schemes when channel access with LBT is used. Similarly, it remains for further study if operation restrictions for channel access without LBT are needed, e.g., compliance with regulations, and/or in presence of ATPC, DFS, long term sensing, or other interference mitigation mechanisms. It is also yet to be determined the mechanism and condition(s) to switch between channel access with LBT and channel access without LBT (if local regulation allows).

However, there has been a recent effort to introduce, into the ETSI standard, support for short control signaling (SCS). Short control signals, as defined by ETSI, are control and management transmissions, that are not required to undergo LBT procedure, but can instead be transmitted without channel sensing (i.e., without LBT), as long as the total duration of SCS transmissions over a 100-ms observation interval does not exceed 10%.

Support for contention-exempt short control signalling transmission in 60 GHz band is defined for regions where LBT is required and short control signaling without LBT is allowed. It should be noted that if regulations do not allow short control signaling exemption in a region when operating with LBT, operation with LBT for these short control signals should be supported. Restrictions to the transmission, such as, on duty cycle (airtime measured over a relatively long period of time), content, TX power, etc. can be discussed when specifications are developed.

Support for short control signals both on DL and UL will be provided, and it has been agreed that contention exempt short control signaling rules can be applicable to the transmission of synchronization signal (SS)/physical broadcast channel (PBCH). For contention exempt short control signalling based DL transmission of SS/PBCH, further consideration is being given to whether the following signals/channels can be multiplexed with SS/PBCH block transmission: RMSI PDCCH and RMSI PDSCH; other broadcast PDSCH; PDSCH without user-plane data; PDCCH; CSI-RS; PRS; other signals/channels contained in discovery burst (i.e., exemption applies to discovery burst). It is noted that total exempted signals/channels should meet the restriction of 10% over any 100 ms interval.

Contention exempt short control signaling rules apply to the transmission of msg1 for the 4-step RACH and MsgA for the 2-step RACH for all supported subcarrier spacings. In a first alternative (Alt 1), the 10% over any 100 ms interval restriction is applicable to all available msg1/msgA resources configured (not limited to the resources actually used) in a cell. In a second alternative (Alt 2), the 10% over any 100 ms interval restriction is applicable to the msg1/msgA transmission from one UE perspective. It is for further study whether other UL signals/channels can be transmitted with contention exempt short control signaling rule, such as msg3, SRS, PUCCH, PUSCH without user plain data, etc.

Failures in accessing the channel considerably complicate NR operation on unlicensed spectrum. Especially for UL, an LBT failure can cause significant delays. For configured grant (CG)-physical uplink shared channel (PUSCH), a gNB cannot know if the UE intended to transmit anything on a given resource (but LBT failure prevented the transmission), or not. The additional delay may be particularly problematic as CG-PUSCH may be used to achieve short latency. For scheduled UL transmissions, the gNB can perform blind decoding of UL transmission (e.g., demodulation reference signal (DMRS)), and reschedule the data transmission for the UE. However, the gNB cannot know if the UL transmission was blocked by LBT or if the UE just missed the UL grant, potentially requiring for lower physical downlink control channel (PDCCH) code rate. As will be discussed in detail below, certain example embodiments described herein may provide methods for mitigating the uncertainty associated with LBT failures when operating on unlicensed spectrum.

According to some example embodiments, if a UE fails to transmit PUSCH due to LBT, it will still transmit an indication of the LBT failure as short control signaling. The indication may correspond to a scheduling request indication, that is, a UE transmitting the indication asks for gNB to provide resources for PUSCH transmission. In some embodiments, it may also be possible to use another LBT later due to some delay before the indication needs to be transmitted.

Figure 1:
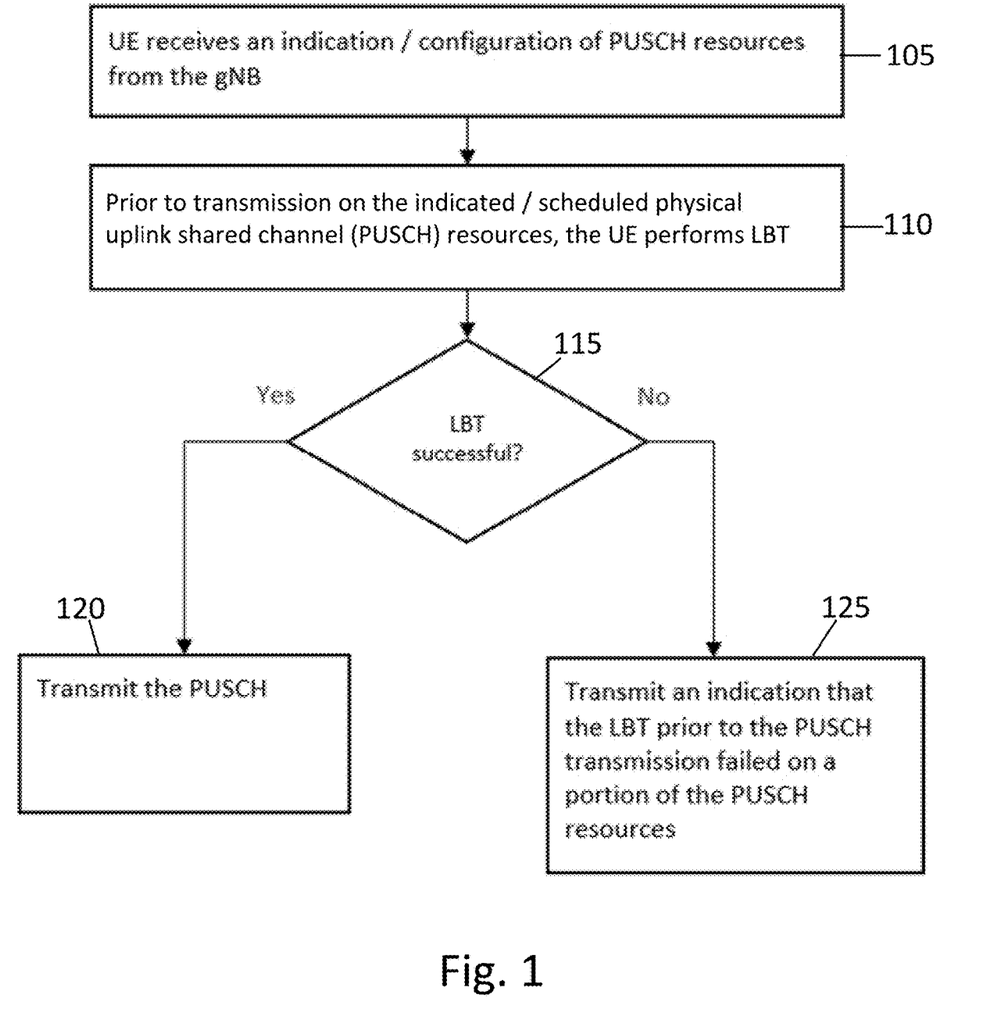
FIG. 1 illustrates an example flow chart of a method, according to an embodiment.

FIG. 1 illustrates an example flow diagram of a method for LBT failure triggered scheduling request indication, according to one example embodiment. In certain example embodiments, the flow diagram of FIG. 1 may be performed by a network entity or network node in a communications system, such as LTE or 5G NR. For instance, in some example embodiments, the network entity performing the method of FIG. 1 may include a UE, SL UE, mobile station, IoT device, UE type of road side unit (RSU), other device, or the like.

As illustrated in the example of FIG. 1, the method may include, at 105, receiving an indication and/or configuration of the PUSCH resources to use from a gNB. In an embodiment, the indication may include an UL grant. For example, in case of dynamic scheduling, the receiving 105 may include receiving an uplink grant. In another embodiment, in case of configured grant transmission, the receiving 105 may include receiving the CG-PUSCH configuration or activation message.

As further illustrated in the example of FIG. 1, the method may include, at 110, performing LBT prior to an intended UL transmission. If it is determined that the LBT is successful at 115, then the method may include transmitting the PUSCH as normal at 120. If it is determined that the LBT is not successful at 115, the method may include, at 125, transmitting, on a portion of the indicated PUSCH resources, an indication of the LBT failure (i.e., intention to transmit PUSCH) using one of the options described below.

Example embodiments can provide several alternatives for implementing the LBT failure indication. For instance, in certain embodiments, the indication can be transmitted in the first symbol of the PUSCH allocation.

Alternatively or additionally, in some embodiments, the indication can be transmitted on a later symbol during the PUSCH allocation (i.e., on a symbol after the first symbol of the PUSCH allocation). This alternative can allow for more processing time for the UE, but may reduce processing time available for the gNB. Hence, the symbol location is a compromise between the two. In one example embodiment, the second DMRS and/or the CG-UCI may be utilized for transmission of the indication; however, any other symbol may also be used in certain embodiments. It may be desirable to avoid coding the transmission again, but in such a case, e.g., the first symbol transmission could be used (DMRS or/and PUSCH). According to some embodiments, the symbol position could also be used to convey information, such as energy level.

According to certain embodiments, in the case of transmission of the indication on a later symbol during the PUSCH allocation, the UE can also perform another LBT, rather than use SCS. Since there is more time for performing the LBT, the second LBT may be more likely to succeed than the first LBT.

Figure 2A:
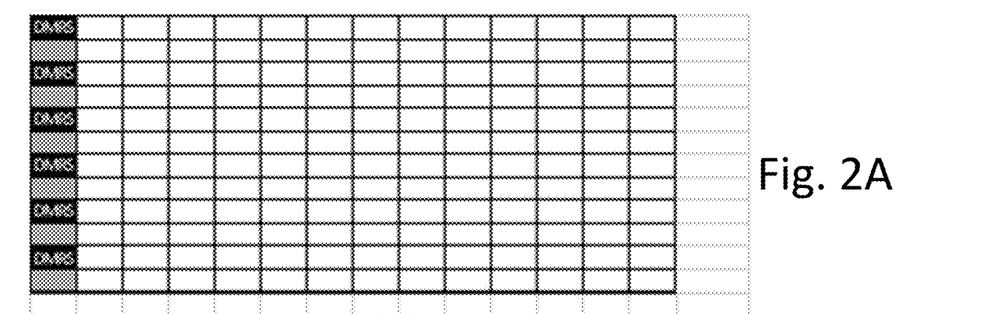
FIG. 2A illustrates one alternative for signaling on PUSCH resources, according to an example embodiment.

In one embodiment, the indication may comprise front-loaded DMRS, which may be transmitted during the first PUSCH symbol. The data resource elements (REs) in the first symbol may be left empty, hence in gNB receiver DTX detection can be done for DMRS and data separately and results be compared. If DMRS is detected but the data is absent, then LBT failure is detected. FIG. 2A illustrates an example of this embodiment where the indication is a front-loaded DMRS transmitted during the first PUSCH symbol.

Figure 2B:
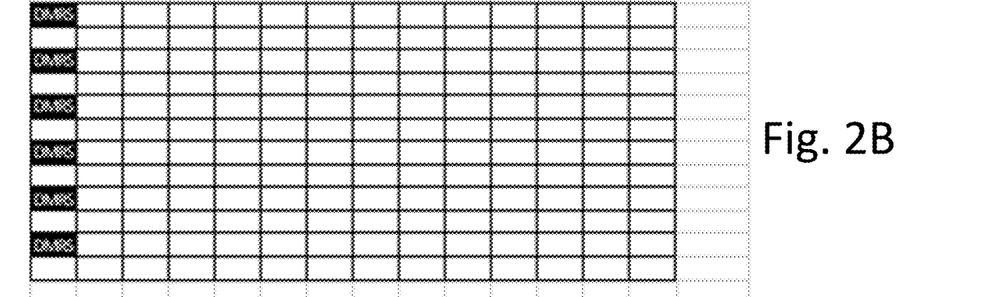
FIG. 2B illustrates another alternative for signaling on PUSCH resources, according to an example embodiment.

According to a further embodiment, the indication may comprise the front-loaded DMRS as well as the UL-SCH resource elements on the same symbol, which may be the first symbol of the PUSCH transmission. In other words, in this embodiment, PUSCH transmission may just be dropped after the first symbol. In this case, both DMRS and PUSCH data can be used for DTX detection thereby improving the performance of the detection. Also, known data could be used for PUSCH but this may complicate coding of the transmission in the UE so it may be preferable to use the intended transmission. FIG. 2B illustrates an example of this embodiment where the indication includes the front-loaded DMRS and the UL-SCH resource elements transmitted on the first symbol of the PUSCH transmission.

Figure 2C:
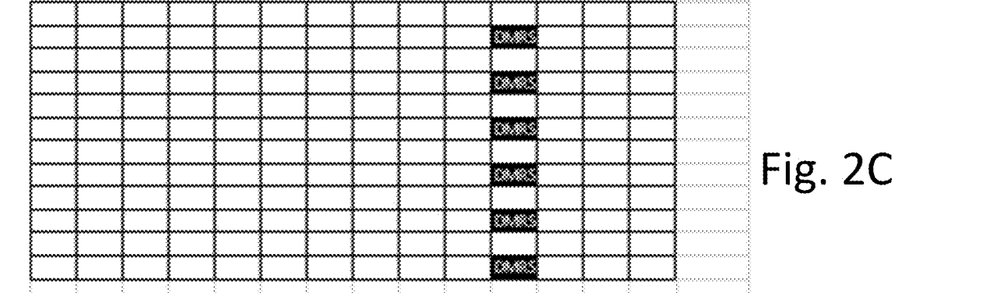
FIG. 2C illustrates another alternative for signaling on PUSCH resources, according to an example embodiment.

In a further embodiment, the indication may be comprised in the second or later (i.e., third) DMRS of the PUSCH allocation transmitted without the associated UL-SCH data. This may allow for more processing time for the UE to decide exactly what to transmit. FIG. 2C illustrates an example of this embodiment where the indication includes DMRS and is transmitted on a symbol later than the first symbol of the PUSCH transmission.

Figure 2D:
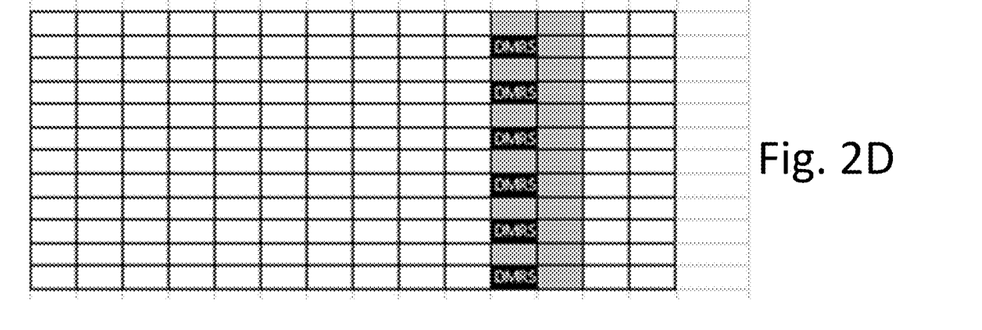
FIG. 2D illustrates another alternative for signaling on PUSCH resources, according to an example embodiment.

According to a further embodiment, the indication may comprise DMRS, together with control information in the same and/or the next symbol, where the control information may provide information about the energy level detected when the measurement was done for LBT. Detected energy level may be useful information for the network because it provides additional information about the load level in the network. FIG. 2D illustrates an example of this embodiment in which the indication includes a DMRS transmitted on a symbol later than the first symbol of the PUSCH transmission, and control information transmitted in the same or next symbol.

Table 1 depicts another example of detected energy level signalling where indication of energy level is done using symbol index of DMRS. Here, it is assumed that symbol indices in the middle of the slot are used to allow processing time for both UE and gNB. In this example, detected energy levels are assuming energy threshold to be −47 dBm (according to ETSI EN 302 567, assuming 2 GHz bandwidth).

TABLE 1

| Example of energy level signalling | |
| --- | --- |
| Symbol index for DMRS | Detected energy level |
| 5 | −47 dBm |
| 6 | −44 dBm |

TABLE 1-continued

| Example of energy level signalling | |
| --- | --- |
| Symbol index for DMRS | Detected energy level |
| 7 | −41 dBm |
| 8 | −38 dBm |

Figure 3A:
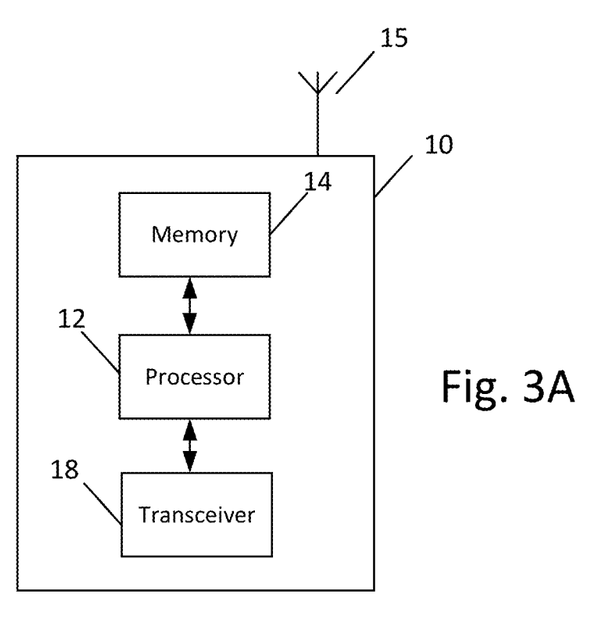
FIG. 3A illustrates an example block diagram of an apparatus, according to an embodiment.

FIG. 3A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3A.

As illustrated in the example of FIG. 3A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, WLAN access point, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-2, or any other method described herein. In some embodiments, as discussed herein, apparatus 10 may be configured to perform a procedure relating to handling of LBT failure, for example.

According to an example embodiment, apparatus 10 may be controlled by memory 14 and processor 12 to transmit an indication or configuration of PUSCH resources to at least one UE. In case of dynamic scheduling, the indication or configuration may include an uplink grant. In case of configured grant transmission, the indication or configuration may include configured grant (CG) physical uplink shared channel (PUSCH) configuration or activation message.

In an embodiment, apparatus 10 may be controlled by memory 14 and processor 12 to receive an intended transmission, from the at least one UE, when a LBT performed by the at least one UE is successful. In a further embodiment, apparatus 10 may be controlled by memory 14 and processor 12 to receive, from the at least one UE, an indication of listen before talk (LBT) failure by receiving a portion of the intended transmission subsequent to the listen before talk (LBT). According to one embodiment, the indication may be received in a first symbol of the PUSCH resources. For example, the indication may be received as or in a DMRS on the first symbol of the PUSCH resources. Additionally or alternatively, UL-SCH REs may be received along with the DMRS in the first symbol of the PUSCH resources.

In a further embodiment, apparatus 10 may be controlled by memory 14 and processor 12 to receive the indication in a symbol after or later than the first symbol of the PUSCH resources. For example, the indication may be received as or in a DMRS in a second, third or later symbol of the PUSCH resources. In an embodiment, control information may be received in the same symbol as the DMRS or a next symbol after the DMRS. For instance, the control information may include information about an energy level detected when measurement was performed for the listen before talk (LBT), as discussed in detail above.

Figure 3B:
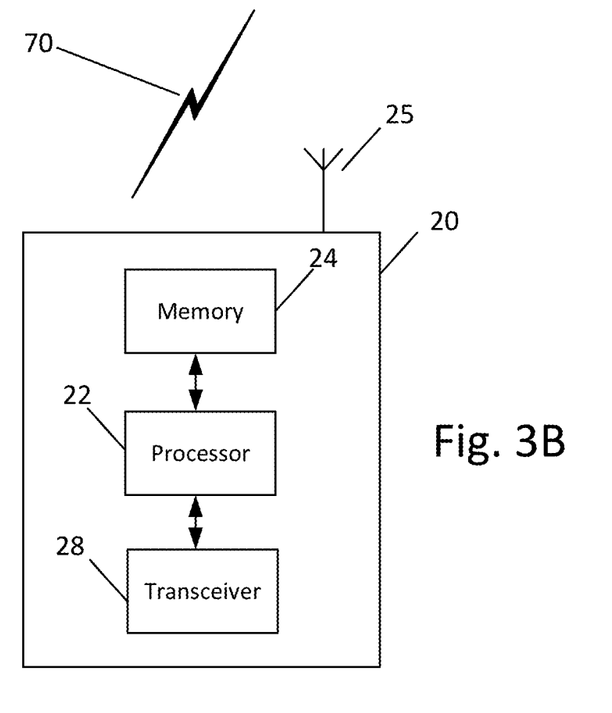
FIG. 3B illustrates an example block diagram of an apparatus, according to an embodiment.

FIG. 3B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3B.

As illustrated in the example of FIG. 3B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-2, or any other method described herein. For example, in an embodiment, apparatus 20 may be controlled to perform a process relating to LBT failure handling, as described in detail elsewhere herein.

In an example embodiment, apparatus 20 may be controlled by memory 24 and processor 22 to perform LBT. When the LBT is successful, apparatus 20 may be controlled by memory 24 and processor 22 to transmit an intended transmission subsequent to the LBT. When the LBT is not successful, apparatus 20 may be controlled by memory 24 and processor 22 to transmit an indication of LBT failure by transmitting a portion of the intended transmission subsequent to the LBT.

According to an embodiment, apparatus 20 may be controlled by memory 24 and processor 22 to receive an indication or configuration of PUSCH resources from a network node. In case of dynamic scheduling, the indication or configuration may include an uplink grant. In case of configured grant transmission, the indication or configuration may include configured grant (CG) physical uplink shared channel (PUSCH) configuration or activation message. In one embodiment, apparatus 20 may be controlled by memory 24 and processor 22 to perform the LBT prior to the physical uplink shared channel (PUSCH) resources. When the LBT is successful, apparatus 20 may be controlled by memory 24 and processor 22 to the intended transmission on the physical uplink shared channel (PUSCH) resources. When the listen before talk (LBT) is not successful, apparatus 20 may be controlled by memory 24 and processor 22 to transmit the portion of the intended transmission on the physical uplink shared channel (PUSCH) resources.

In one embodiment, apparatus 20 may be controlled by memory 24 and processor 22 to transmit the indication of the LBT failure on a first symbol of the physical uplink shared channel (PUSCH) resources. For example, according to an embodiment, apparatus 20 may be controlled by memory 24 and processor 22 to transmit the indication of the LBT failure as DMRS on the first symbol of the physical uplink shared channel (PUSCH) resources. As another example, apparatus 20 may be controlled by memory 24 and processor 22 to transmit the indication of the LBT failure as DMRS and uplink shared channel (UL-SCH) resource elements on the first symbol of the physical uplink shared channel (PUSCH) resources.

In a further embodiment, apparatus 20 may be controlled by memory 24 and processor 22 to transmit the indication of the LBT failure on a symbol after the first symbol of the physical uplink shared channel (PUSCH) resources. In an embodiment, apparatus 20 may then be controlled by memory 24 and processor 22 to perform another or second LBT. According to one embodiment, apparatus 20 may be controlled by memory 24 and processor 22 to transmit the indication of the LBT failure as a DMRS on a second, third or later symbol of the physical uplink shared channel (PUSCH) resources. In a further embodiment, apparatus 20 may be controlled by memory 24 and processor 22 to transmit the indication of the LBT failure as a DMRS on a second, third or later symbol of the physical uplink shared channel (PUSCH) resources, and transmit control information in a same symbol as the DMRS or a next symbol after the DMRS. In one example, the control information may include information about an energy level detected when measurement was performed for the LBT.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide ways to mitigate the uncertainty associated with LBT failures when operating on unlicensed spectrum. In certain embodiments, for CG-PUSCH, a gNB can obtain timely information that UE has data to transmit. The gNB can then schedule PUSCH faster thereby reducing the latency caused to the UL traffic, which may potentially be latency sensitive. Since the gNB obtains the information that UE has data to transmit, the gNB can use scheduled transmission instead of waiting for the next CG transmit allocation. For scheduled UL transmissions, the gNB obtains knowledge that UL transmission was blocked by LBT and UE received UL grant correctly. The gNB would need to re-schedule the UL transmission, but the gNB does not need to adjust PDCCH coding (aggregation level). Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
performing, by a user equipment, listen before talk (LBT);
in response to the listen before talk (LBT) being successful, transmitting an intended transmission subsequent to the listen before talk (LBT);
in response to the listen before talk (LBT) not being successful, transmitting an indication of listen before talk (LBT) failure by transmitting a portion of the intended transmission subsequent to the listen before talk (LBT).

2. The method of claim 1, comprising:
receiving configuration of physical uplink shared channel (PUSCH) resources from a network node;
in case of dynamic scheduling, the configuration comprises an uplink grant; and
in case of configured grant transmission, the configuration comprises configured grant (CG) physical uplink shared channel (PUSCH) configuration or activation message.

3. The method of claim 2, wherein:
the performing comprises performing the listen before talk (LBT) prior to transmission on the physical uplink shared channel (PUSCH) resources;
in response to the listen before talk (LBT) being successful, the transmitting comprises transmitting the intended transmission on the physical uplink shared channel (PUSCH) resources;
in response to the listen before talk (LBT) not being successful, the transmitting comprises transmitting the portion of the intended transmission on the physical uplink shared channel (PUSCH) resources.

4. The method of claim 2, wherein:
the transmitting of the indication of the listen before talk (LBT) failure comprises transmitting the indication on a first symbol of the physical uplink shared channel (PUSCH) resources.

5. The method of claim 4, wherein:
the transmitting of the indication of the listen before talk (LBT) failure comprises transmitting a demodulation reference signal (DMRS) or transmitting a demodulation reference signal (DMRS) and uplink shared channel (UL-SCH) resource elements on the first symbol of the physical uplink shared channel (PUSCH) resources.

6. The method of claim 2, wherein:
the transmitting of the indication of the listen before talk (LBT) failure comprises transmitting the indication on symbol after a first symbol of the physical uplink shared channel (PUSCH) resources.

7. The method of claim 6, comprising:
performing another listen before talk (LBT) prior to transmitting the indication on a symbol after a first symbol of the physical uplink shared channel (PUSCH) resources.

8. The method of claim 6, wherein:
the transmitting of the indication of the listen before talk (LBT) failure comprises transmitting a demodulation reference signal (DMRS) on a second or later symbol of the physical uplink shared channel (PUSCH) resources.

9. The method of claim 6, wherein the transmitting of the indication of the listen before talk (LBT) failure comprises:
transmitting a demodulation reference signal (DMRS) on a second or later symbol of the physical uplink shared channel (PUSCH) resources, and transmitting control information in a same symbol as the demodulation reference signal or a next symbol after the demodulation reference signal,
wherein the control information comprises information about an energy level detected when measurement was performed for the listen before talk (LBT).

10. The method of claim 6, wherein the transmitting of the indication of the listen before talk (LBT) failure comprises:
transmitting a demodulation reference signal (DMRS), wherein a symbol index for the demodulation reference signal (DMRS) indicates a detected energy level.

11. An apparatus, comprising:
at least one processor; and
at least one memory comprising computer program code,
the at least one memory and computer program code configured, with the at least one processor, to cause the apparatus at least to perform:
performing listen before talk (LBT);
in response to the listen before talk (LBT) being successful, transmitting an intended transmission subsequent to the listen before talk (LBT);

in response to the listen before talk (LBT) not being successful, transmitting an indication of listen before talk (LBT) failure by transmitting a portion of the intended transmission subsequent to the listen before talk (LBT).

12. The apparatus of claim 11, wherein the at least one memory and computer program code are configured, with the at least one processor, to cause the apparatus at least to perform:
receiving a configuration of physical uplink shared channel (PUSCH) resources from a network node;
in case of dynamic scheduling, the configuration comprises an uplink grant; and
in case of configured grant transmission, the configuration comprises configured grant (CG) physical uplink shared channel (PUSCH) configuration or activation message.

13. The apparatus of claim 12, wherein:
the performing comprises performing the listen before talk (LBT) prior to transmission on the physical uplink shared channel (PUSCH) resources;
in response to the listen before talk (LBT) being successful, the transmitting comprises transmitting the intended transmission on the physical uplink shared channel (PUSCH) resources;
in response to the listen before talk (LBT) not being successful, the transmitting comprises transmitting the portion of the intended transmission on the physical uplink shared channel (PUSCH) resources.

14. The apparatus of claim 12, wherein:
the transmitting of the indication of the listen before talk (LBT) failure comprises transmitting the indication on a first symbol of the physical uplink shared channel (PUSCH) resources.

15. The apparatus of claim 14, wherein:
the transmitting of the indication of the listen before talk (LBT) failure comprises transmitting a demodulation reference signal (DMRS) or transmitting a demodulation reference signal (DMRS) and uplink shared channel (UL-SCH) resource elements on the first symbol of the physical uplink shared channel (PUSCH) resources.

16. The apparatus of claim 12, wherein:
the transmitting of the indication of the listen before talk (LBT) failure comprises transmitting the indication on symbol after a first symbol of the physical uplink shared channel (PUSCH) resources.

17. The apparatus of claim 16, wherein the at least one memory and computer program code are configured, with the at least one processor, to cause the apparatus at least to:
perform another listen before talk (LBT) prior to transmitting the indication on a symbol after a first symbol of the physical uplink shared channel (PUSCH) resources.

18. The apparatus of claim 16, wherein:
the transmitting of the indication of the listen before talk (LBT) failure comprises transmitting a demodulation reference signal (DMRS) on a second or later symbol of the physical uplink shared channel (PUSCH) resources.

19. The apparatus of claim 16, wherein the transmitting of the indication of the listen before talk (LBT) failure comprises:
transmitting a demodulation reference signal (DMRS) on a second or later symbol of the physical uplink shared channel (PUSCH) resources, and transmitting control information in a same symbol as the demodulation reference signal or a next symbol after the demodulation reference signal,
wherein the control information comprises information about an energy level detected when measurement was performed for the listen before talk (LBT).

20. The apparatus of claim 16, wherein the transmitting of the indication of the listen before talk (LBT) failure comprises:
transmitting a demodulation reference signal (DMRS), wherein a symbol index for the demodulation reference signal (DMRS) indicates a detected energy level.

* * * * *